No. 745,582. PATENTED DEC. 1, 1903.
H. G. DITTBENNER.
CUSHION FOR LOG CARRIAGES.
APPLICATION FILED FEB. 21, 1903.
NO MODEL. 2 SHEETS—SHEET 1.
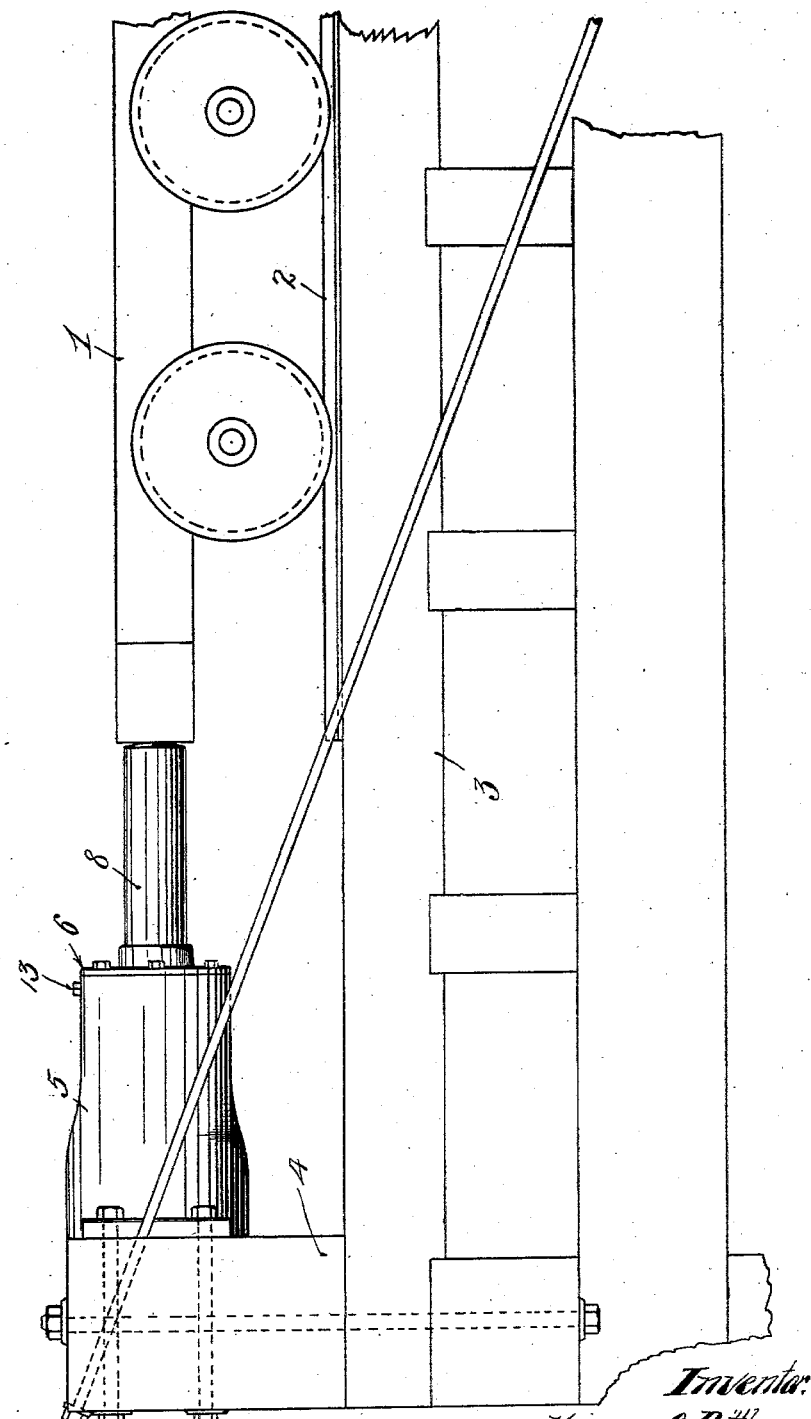

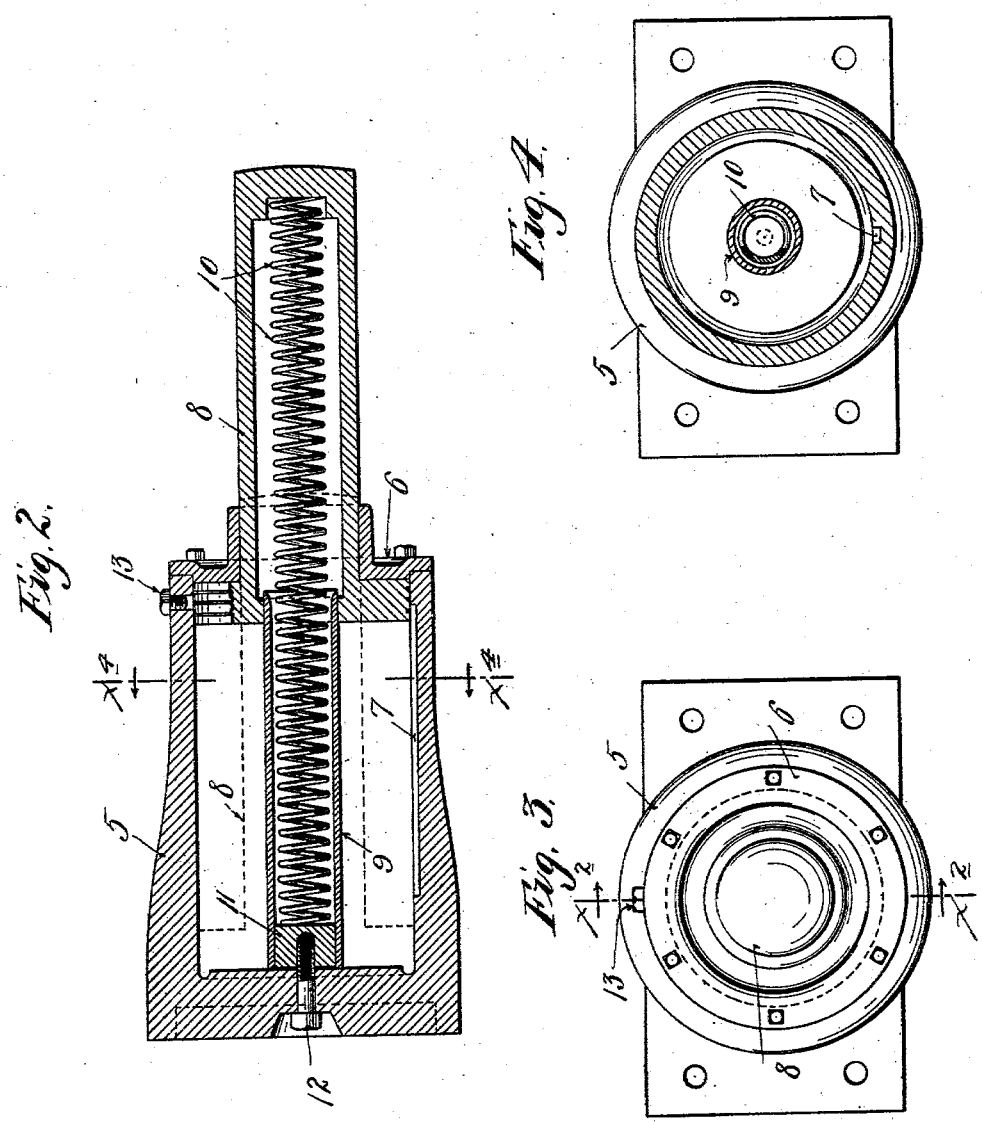

No. 745,582. Patented December 1, 1903.

UNITED STATES PATENT OFFICE.

HERMAN G. DITTBENNER, OF MINNEAPOLIS, MINNESOTA.

CUSHION FOR LOG-CARRIAGES.

SPECIFICATION forming part of Letters Patent No. 745,582, dated December 1, 1903.

Application filed February 21, 1903. Serial No. 144,448. (No model.)

*To all whom it may concern:*

Be it known that I, HERMAN G. DITTBENNER, a citizen of the United States, residing at Minneapolis, in the county of Hennepin and State of Minnesota, have invented certain new and useful Improvements in Cushions for Log-Carriages; and I do hereby declare the following to be a full, clear, and exact description of the invention, such as will enable others skilled in the art to which it appertains to make and use the same.

My present invention has for its object to provide an improved cushion especially adapted for cushioning the movements of log-carriages; and to such ends the invention consists of the novel devices and combinations of devices hereinafter described, and defined in the claims.

The invention is illustrated in the accompanying drawings, wherein like characters indicate like parts throughout the several views.

Figure 1 is a view in side elevation with some parts broken away, showing one of my improved cushions applied in position to cushion the movements of the log-carriage. Fig. 2 is a horizontal section through one of the cushions on the line $x^2\ x^2$ of Fig. 3. Fig. 3 is a front end elevation of the cushion, and Fig. 4 is a transverse vertical section on the line $x^4\ x^4$ of Fig. 2.

In Fig. 1 the numeral 1 indicates the log-carriage, which moves over rails 2, supported by beamwork 3. The base end of the cushion is anchored by bolts or otherwise to a transverse beam 4, which in turn is securely anchored to the beamwork 3.

The numeral 5 indicates the cylinder member of the cushion, having at its forward end a detachable head 6 and formed within with a longitudinal leakage passage or groove 7, which groove at its rear end terminates forward of the rear head or end of said cylinder. The numeral 8 indicates the piston member of the cushion, the stem of which is cylindrical and works through a large bearing-hub of the cylinder-head 6. A large sleeve 9 is rigidly secured at its rear end to the inner or rear head of the cylinder 5, and at its forward end it telescopes through the head and into the cylindrical stem of the piston 8. A coiled retracting-spring 10 is placed within the sleeve 9 and cylindrical stem or piston 8 and normally holds the piston with its stem projecting to its limit, as shown in Fig. 2. The spring 10 reacts against the outer end of the piston-stem and against a plug 11, which, as shown, is secured within the rear end of the sleeve 9 and is engaged by a screw-bolt 12, passed through the rear head of the cylinder. The screw 12 serves to rigidly secure the sleeve 9 in working position, with its axis concentric to the axis of said cylinder and to the axis of said piston.

It is important to note that the groove 7 is formed in the bottom of the cylinder, so that oil introduced into the cylinder will run down and lodge in the same. In the upper portion of the cylinder is an oil-hole that is normally closed by a plug 13. As is obvious, oil may be readily introduced in the cylinder when the plug 13 is removed.

When the projecting end of the piston is struck by the log-carriage, the piston will of course be forced rearward against the pressure of the air which is caged in the cylinder back of the piston and finds but a comparatively slow escape to the front of the piston through the leakage-groove 7. This rearward movement of the piston is further resisted to some extent both by the retracting-spring 10 and by the air which is compressed within the sleeve 9 and the stem of the piston; but these actions of the said spring and the air caged and compressed within the said sleeve and piston-stem are subordinate to more important functions, presently to be described. When the head of the piston passes to the rear of the rearward extremity of the leakage-groove 7, the air caged in the rear end of the cylinder back of the piston finds no further escape, and hence affords a greatly-increased resistance to the further rearward movement of the piston and prevents the piston-head from being forced into contact with the rear head of the cylinder.

The air caged and compressed within the sleeve 9 and the stem of the piston serves to force the piston forward or backward to normal position, and the retracting-spring 10 assists in this action. Were it not for the leakage-groove 7, the piston would be given its return or forward movement with a quick jump or rebound; but the leakage-groove under the rearward movement of the piston allows air to escape in front of the piston-head, and this air must work its way back to the rear portion of the cylinder before the piston can be restored to normal position. In this way a reaction-cushion is afforded which retards the movement of the piston back to its normal position.

In practice I have found that even without the retracting-spring air compressed in the sleeve 9 and stem of the piston will cause the return of the piston nearly, but usually not quite, to normal position. The retracting-spring is therefore an auxiliary device for insuring the return of the piston to normal position.

As already stated, the leakage-groove 7 will become filled with lubricating-oil. When the piston is moved, and especially when it is suddenly moved, rearward, the air forced to escape through the leakage-groove will blow the oil from between the same and the piston-head in a spray, and the oil thus sprayed or atomized will serve to thoroughly lubricate all of the frictionally-engaging parts of the device. This action in practice is very important. Obviously to accomplish this second function of the groove 7 the said groove must be placed in the lower portion of the cylinder.

The device described is of course capable of modification within the scope of my invention as herein set forth and claimed. The efficiency of the device described has been thoroughly demonstrated in actual practice.

What I claim, and desire to secure by Letters Patent of the United States, is as follows:

1. The combination with a cylinder having an internal sleeve, of a piston having a hollow stem telescoping with said sleeve and cooperating therewith to afford a secondary compression-chamber, substantially as described.

2. The combination with a cylinder having an internal sleeve, of a piston having a hollow stem telescoping with said sleeve, and a spring placed within said sleeve and the stem of said piston, substantially as described.

3. The combination with a cylinder having an internal sleeve and an internal leakage-groove, of a coöperating piston having a hollow stem that telescopes with said sleeve, substantially as described.

4. A cushion comprising a cylinder having a groove in its lower portion, a plugged oil-hole in said cylinder permitting of the introduction of oil, and a piston working in said cylinder and coöperating with said groove to cause air to blow oil into a spray.

5. In a cushion, the combination with the cylinder 5 having the groove 7 and axial sleeve 9, of a coöperating piston 8 working within said cylinder and having a hollow stem telescoping over said sleeve, and the spring 10 compressed within said sleeve and the hollow stem of said piston, substantially as described.

In testimony whereof I affix my signature in presence of two witnesses.

HERMAN G. DITTBENNER.

Witnesses:
ELIZABETH H. KELEHER,
F. D. MERCHANT.